United States Patent [19]

Dudek et al.

[11] 4,014,690
[45] Mar. 29, 1977

[54] GOLD-COLORED ALLOY SOLDERS

[75] Inventors: Ronald P. Dudek, River Grove; Peter Kosmos, Alsip; John A. Tesk, Woodridge, all of Ill.

[73] Assignee: Howmedica, Inc., New York, N.Y.

[22] Filed: May 14, 1976

[21] Appl. No.: 686,347

[52] U.S. Cl. ............................................. 75/165
[51] Int. Cl.² ........................................ C22C 5/02
[58] Field of Search ............ 75/165, 134 N, 134 C, 75/134 T

[56] References Cited

UNITED STATES PATENTS

| | | | |
|---|---|---|---|
| 3,134,671 | 5/1964 | Prosen | 75/165 X |
| 3,136,634 | 6/1964 | Zwingmann | 75/165 |
| 3,254,279 | 5/1966 | Cohn et al. | 75/165 X |
| 3,574,610 | 4/1971 | Prosen | 75/165 |
| 3,574,611 | 4/1971 | Prosen | 75/165 |
| 3,667,936 | 6/1972 | Katz | 75/134 N |
| 3,892,564 | 7/1975 | Hatswell et al. | 75/165 |

*Primary Examiner*—L. Dewayne Rutledge
*Assistant Examiner*—E. L. Weise
*Attorney, Agent, or Firm*—Francis X. Murphy; Charles J. Knuth; Allen J. Spiegel

[57] ABSTRACT

A gold-colored alloy solder for use with dental gold alloys and gold-colored jewelry alloys includes the following ranges of constituents in percentages by weight:

| Constituent | Proportional Range |
|---|---|
| Gold | 60 – 70% |
| Platinum | 0 – 10% |
| Palladium | 0 – 10% |
| Copper | 10 – 25% |
| Gallium | 5 – 10% |
| Iridium | 0 – 0.01% | with the proviso that the total of said platinum and palladium is from about 5–10%.

5 Claims, No Drawings

GOLD-COLORED ALLOY SOLDERS

BACKGROUND OF THE INVENTION

This invention relates to alloy solders. More specifically it relates to gold-colored alloy solders which are used with dental gold alloys and gold-colored jewelry alloys.

Solders for the above uses must possess excellent solderability with excellent flow characteristics in order to produce sound, porous-free joints. These solders must also possess the hardness and strength necessary for use in load bearing aplications which are common in dentistry and in jewelry.

U.S. Pat. No. 3,892,564 discloses gallium-bearing gold alloys, particularly low melting point alloys, useful as solders for articles of jewelry and in dental work, and containing apart from impurities, 1–10 wt. percent gallium, 0–25 wt. percent copper, 0–33 wt. percent silver and 0–10 wt. percent zinc, the balance in all cases consisting of gold. Specifically disclosed is an alloy containing 10% gallium, 15% copper and 75% gold.

SUMMARY OF THE INVENTION

It has now been discovered that a gold-colored alloy solder for use with dental gold alloys and gold-colored jewelry alloys, having the aforementioned characteristics can be achieved by incorporating the following ranges of constituents in percentages by weight:

| Constituent | Proportional Range |
| --- | --- |
| Gold | 60 – 70% |
| Platinum | 0 – 10% |
| Palladium | 0 – 10% |
| Copper | 10 – 25% |
| Gallium | 5 – 10% |
| Iridium | 0 – 0.01% | with the proviso that the total of said platinum and palladium is from about 5-10%.

DETAILED DESCRIPTION OF THE INVENTION

The relative proportions of the various elements comprising the new alloy solders of the invention have been determined as the result of intensive investigation to obtain an alloy solder having optimum chemical and physical properties. Specifically, we have found that the alloy solder of the invention should contain by weight gold 60–60%, platinum 0–10%, palladium 0–10%, copper 10–25%, gallium 5–10%, and iridium 0–0.01% with the proviso that the total of said platinum and palladium is from about 5–10%. Preferred alloy solders are those which contain about 10–15% copper and about 70% gold; and about 20–25% copper and about 60% gold.

Particular examples of the alloy solders of this invention are listed below in Examples I-IX giving especially preferred compositions in percentages by weight. These gold-colored alloy solders have been found particularly useful for soldering dental gold alloys and gold-colored jewelry.

The solders of this invention possess excellent solderability with excellent flow characteristics, resulting in sound, porous-free joints. They also possess the hardness and strength necessary for use in load bearing applications which are common in dentistry and jewelry. The use of palladium in the solders of this invention substantially reduces the cost in comparison with those disclosed in U.S. Pat. No. 3,892,564, previously discussed.

The role of each of the respective alloying elements is believed to be as follows:

Gold: Noble metal addition which improves the corrosion and tarnish resistance of the alloy and contributes to the "gold" color of the alloy.

Platinum: Noble metal addition which improves the corrosion and tarnish resistance of the alloy and also acts as a hardening agent to control the alloy's hardness and strength to specific values.

Palladium: Noble metal addition which improves the corrosion and tarnish resistance of the alloy and also acts as a hardening agent to control the alloy's hardness and strength to specific values.

Copper: Base metal addition which contributes to the "gold" color of the alloys and also acts as a hardening agent to increase the hardness and strength of the alloy.

Gallium: Base metal addition which improves the corrosion and tarnish resistance of the alloy. The addition of gallium also acts to enhance the gold color of the alloy by interacting in a way to lessen the red-rose hue typical of similar copper containing alloys without gallium. Gallium additions also have the effect of lowering the hardness of the alloys as compared to similar alloys not containing gallium. Gallium additions also lower the melting point of the alloy system to improve solderability.

Iridium: Noble metal addition as a grain refiner.

The following specific properties were determined in the manner described below:

Hardness

Equipment - Rockwell Hardness Tester

Test Specimen - cast piece ½ inch × ¾ inch × ⅛ inch thick.

Test Method — the hardness numbers were determined in the as cast condition and converted to Brinell values.

Sag Temperature

Equipment — Muffle furnace with two point support stand having 1 inch span.

Test Specimen - Cast piece 1 ¼ inch long, ⅜ inch wide and 0.030–0.040 inch thick.

Test Method — Support stand preheated to within 200° F of anticipated sag temperature. Specimen is placed on stand and allowed to equilibrate. The temperature is then raised in 20° increments until sag is visually observed.

The following examples are merely illustrative and in no way limit the scope of the claims.

EXAMPLE I

| Constituent | Composition |
| --- | --- |
| Gold | 70% |
| Platinum | 8.99% |
| Palladium | 1% |
| Copper | 10% |
| Gallium | 10% |
| Iridium | 0.01% |

Brinell Hardness — 222

Sag Temperature — 1000°–1050° F.

EXAMPLE II

| Constituent | Composition |
|---|---|
| Gold | 70% |
| Platinum | 0.99% |
| Palladium | 9% |
| Copper | 10% |
| Gallium | 10% |
| Iridium | 0.01% |

Brinell Hardness — 263
Sag Temperature — 900°–1000° F.

EXAMPLE III

| Constituent | Composition |
|---|---|
| Gold | 60% |
| Platinum | 4.99% |
| Copper | 25% |
| Gallium | 10% |
| Iridium | 0.01% |

Brinell Hardness — 114
Sag Temperature — 1150°–1200° F.

EXAMPLE IV

| Constituent | Composition |
|---|---|
| Gold | 60% |
| Platinum | 0.09% |
| Palladium | 4.9% |
| Copper | 25% |
| Gallium | 10% |
| Iridium | 0.01% |

Brinell Hardness — 185
Sag Temperature — 1150°–1200° F.

EXAMPLE V

| Constituent | Composition |
|---|---|
| Gold | 60% |
| Platinum | 0.99% |
| Palladium | 9% |
| Copper | 20% |
| Gallium | 10% |
| Iridium | 0.01% |

Brinell Hardness — 256
Sag Temperature — 1150°–1200° F.

EXAMPLE VI

| Constituent | Composition |
|---|---|
| Gold | 60% |
| Platinum | 8.99% |
| Palladium | 1% |
| Copper | 20% |
| Gallium | 10% |
| Iridium | 0.01% |

Brinell Hardness — 242
Sag Temperature — 1100°–1200° F.

EXAMPLE VII

| Constituent | Composition |
|---|---|
| Gold | 70% |
| Platinum | 4.99% |
| Palladium | 5% |
| Copper | 10% |
| Gallium | 10% |
| Iridium | 0.01% |

Brinell Hardness — 216
Sag Temperature — 1000°–1100° F.

EXAMPLE VIII

| Constituent | Composition |
|---|---|
| Gold | 70% |
| Platinum | 4.99% |
| Palladium | 5% |
| Copper | 15% |
| Gallium | 5% |
| Iridium | 0.01% |

Brinell Hardness — 222
Sag Temperature — 1200–1350° F.

EXAMPLE IX

| Constituent | Composition |
|---|---|
| Gold | 60% |
| Platinum | 4.99% |
| Palladium | 5% |
| Copper | 25% |
| Gallium | 5% |
| Iridium | 0.01% |

Brinell Hardness — 291
Sag Temperature — 1500°–1550° F.

What is claimed is:

1. A gold-colored alloy solder consisting essentially of the following constituents in the indicated percentages by weight:

| Constituent | Proportional Range |
|---|---|
| Gold | 60 – 70% |
| Platinum | 0 – 10% |
| Palladium | 0 – 10% |
| Copper | 10 – 25% |
| Gallium | 5 – 10% |
| Iridium | 0 – 0.01% | with the proviso that the total of said platinum and palladium is from about 5–10%.

2. An alloy in accordance with claim 1 containing about 10–15% copper and about 70% gold.

3. The alloy solder of claim 2 consisting of the following constituents in approximately the indicated percentages by weight:

| Constituent | Composition |
|---|---|
| Gold | 70% |
| Platinum | 4.99% |
| Palladium | 5% |
| Copper | 10% |
| Gallium | 10% |

-continued

| Constituent | Composition |
|---|---|
| Iridium | 0.01% |

4. An alloy in accordance with claim 1 containing about 20–25% copper and about 60% gold.

5. The alloy solder of claim 4 consisting of the following constituents in approximately the indicated percentages by weight:

| Constituent | Composition |
|---|---|
| Gold | 60% |
| Platinum | 8.99% |
| Palladium | 1% |
| Copper | 20% |
| Gallium | 10% |
| Iridium | 0.01% |

* * * * *